United States Patent [19]

Terada et al.

[11] 4,447,871

[45] May 8, 1984

[54] DATA COMMUNICATION SYSTEM WITH A FRONT-END-PROCESSOR

[75] Inventors: Matsuaki Terada, Sagamigara; Koji Yokota, Kawasaki, both of Japan

[73] Assignee: Hitachi, Ltd., Tokyo, Japan

[21] Appl. No.: 230,805

[22] Filed: Feb. 2, 1981

[30] Foreign Application Priority Data

Feb. 4, 1980 [JP] Japan .................................. 55-11510

[51] Int. Cl.³ .......................... G06F 15/16; G06F 9/19
[52] U.S. Cl. ................................................... 364/200
[58] Field of Search .............................. 364/200, 900

[56] References Cited

U.S. PATENT DOCUMENTS

| | | | |
|---|---|---|---|
| 3,634,830 | 1/1972 | Baskin | 364/200 |
| 3,643,227 | 2/1972 | Smith et al. | 364/200 |
| 4,047,161 | 9/1977 | Davis | 364/200 |
| 4,099,233 | 7/1978 | Barbagelata et al. | 364/200 |
| 4,104,720 | 8/1978 | Gruner | 364/200 |
| 4,149,242 | 4/1979 | Piscataway | 364/200 |
| 4,151,592 | 4/1979 | Suzuki et al. | 364/200 |
| 4,181,936 | 1/1980 | Kober et al. | 364/200 |
| 4,219,873 | 8/1980 | Kober et al. | 364/200 |

*Primary Examiner*—Mark E. Nusbaum
*Assistant Examiner*—Jameson Lee
*Attorney, Agent, or Firm*—Antonelli, Terry & Wands

[57] ABSTRACT

A data communication system which includes a data distributor, a communication station and a plurality of front-end-processors. These front-end-processors are connected with a computer through a common bus. The distributor distributes the data received by the station to one available front-end-processor, which pre-processes the received data, and transfers the pre-processed data to the computer through the bus. By operating the front-end-processors in parallel with respect to successively received packets of data, the processing speed of the system is increased.

13 Claims, 8 Drawing Figures

DATA COMMUNICATION SYSTEM WITH A FRONT-END-PROCESSOR

BACKGROUND OF THE INVENTION

The present invention relates to a data communication system for transferring data between communication lines and computers in a multi-computer system.

An example of a data communication system of this type will be described with reference to FIG. 1 showing a computer network using a loop communication line for interconnecting computers. A data block (which will be hereinafter referred to as a "packet") having a length of about 1000 bits is exchanged between computers 1 via a communication line 2, and each of the computers 1 are connected to the communication line 2 by means of interface units 4, which are called "stations".

The format of the packet 5, as shown in FIG. 2, comprises a first portion 6 providing the station address (A) for designating the station which is to receive the packet, a second portion 8 providing a node address (N) for designating whether the message is for the computer itself or for a device connected thereto, and a third portion 9 providing the port address (P) for designating the output terminal of an imaginary transmission line in the computer 1 in case the message is for the computer itself. The remainder of the packet 5 consists of the message text.

The station 4 judges whether or not the packet 5, which has been sent through the communication line 2, is assigned to it, in accordance with the station address 6, when it receives the packet, and takes the packet 5 into the buffer of the station 4 if the packet 5 includes that station's address. After that, the computer 1 associated with that station 4 is interrupted so that the received packet is sent to the computer 1 in accordance with the program 7 in the computer.

The program 7 of the computer 1 determines from the node address 8 of the packet 5 whether the packet should be sent to the user program in the computer 1 or to one of the terminals 3 associated with the computer. In case the packet 5 is to be sent to the user program, it is distributed to the corresponding program in accordance with the port address 9. That is performed by determining the memory address at which to store that packet and by storing the packet at the memory location indicated by that address.

The program 7 generally requires 2000 to 8000 steps in order to perform the function described above. When the speed of the communication line 2 is improved so that the number of the packets 5 flowing through that line 2 is increased, difficulty in the program processing at the computer 1 takes place. If the time period for the program 7 to process one packet is assumed to be 4 ms (i.e., 2000 steps×2 μs), for example, the packet processing capability of the computer 1 has its upper limit at 250 packets/s. Thus, for this reason, the data communication system according to the prior art has a drawback in that the processing overhead is very time consuming, so that even if the speed of the communication line 2 is high, the computer 1 cannot receive the data at the sending speed of that communication line.

SUMMARY OF THE INVENTION

It is therefore an object of the present invention to provide a data communication system of the type described, in which the packet sent at a high sending speed can be taken at a high speed from a communication line by a computer.

The data communication system according to the present invention is characterized in that at least one front-end-processor is connected between a station and a computer, in that the packet received is transferred to the front-end-processor, and in that most of the packet receiving processing of the computer for successively-received packets is performed by the front-end-processor.

DETAILED DESCRIPTION OF THE PREFERRED EMBODIMENT

Figure 3:
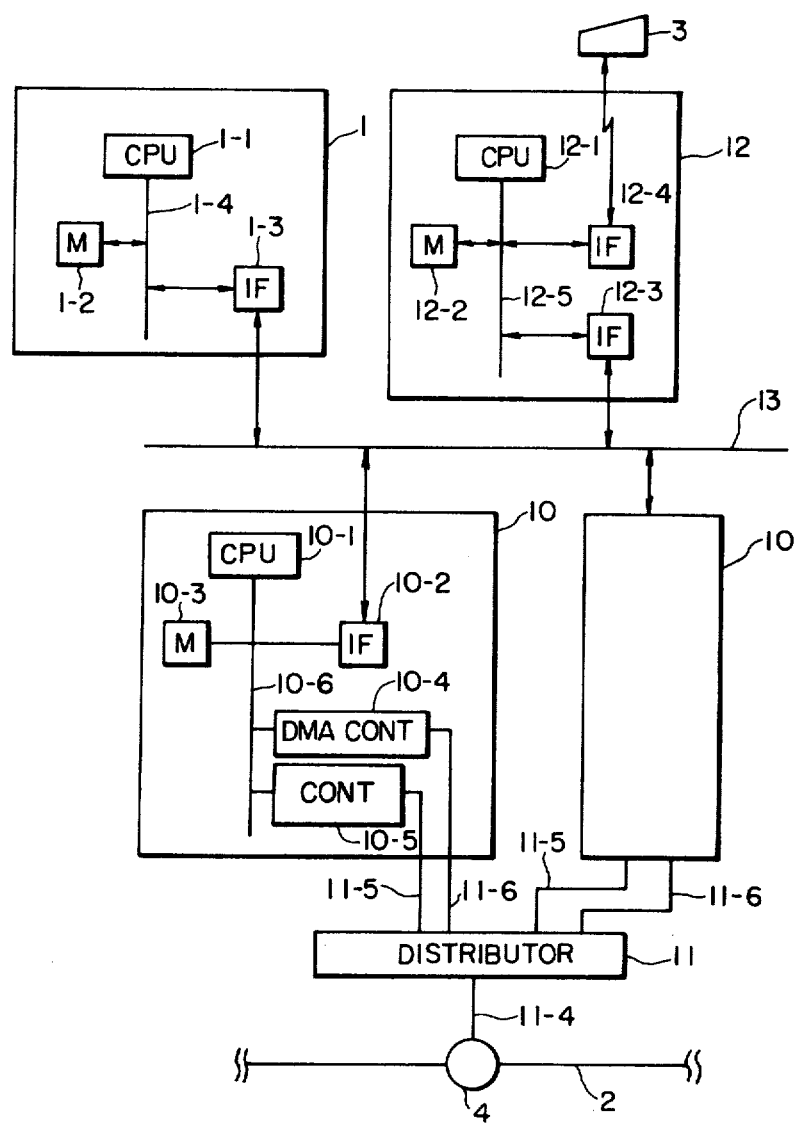
FIG. 3 is a schematic block diagram showing a data communication system according to the present invention.

FIG. 3 shows one embodiment of the data communication system according to the present invention. Between the known station 4 for sending and receiving the packet via the communication line 2, and the computer 1 and the plural terminals 3, there are connected a distributor 11, a plurality of front-end-processors 10 and a plurality of terminal interface processors 12, which are paired with the respective terminals, such that the processors 10, the computer 1 and the terminal interface processors 12 are connected through a bus 13 of the type which can freely carry data in both directions between the various processors connected thereto. For simplicity, here, only two of the processors 10 are shown. For the same purpose, only one terminal 3 of a pair along with the associated terminal interface processor 12 is shown.

The computer 1 is constructed of a known microcomputer, which is composed of a central processing unit 1-1, a memory 1-2, an interface circuit 1-3 and a bus 1-4 for connecting the preceding components, and is connected with the bus 13 through the interface circuit 1-3. The computer 1 performs data transmission with the bus 13 and accomplishes various operations in accordance with the user program therein by the use of the received packet stored in the memory 1-2.

The terminal interface processor 12 (which hereinafter will be called "the terminal interface") is also constructed of a known microcomputer, which is composed of a central processing unit 12-1, a memory 12-2, interface circuits 12-3 and 12-4, and a bus 12-5 for connecting the preceding components such that the interface circuits 12-3 and 12-4 are connected with the bus 13 and the paired terminal 3, respectively. The terminal interface 12 controls the data transmission between the bus 13 and the terminal 3.

Each of the processors 10 is also constructed of a known microcomputer, which is composed of a central processing unit 10-1, an interface circuit 10-2 for controlling connection with the bus 13, a memory 10-3, a direct memory access control circuit 10-4, (i.e., a DMA control circuit) for controlling transfer of the packet between the distributor 11 and the memory 10-3, a status control circuit 10-5 for controlling the operation of the processor 10, and a bus 10-6 for connecting the preceding components. The processor 10 transmits the assigned packet, which has been received from the station 4 through the distributor 11, to either the computer 1 or the terminal interface 12 and determines the store address at which that packet is to be stored in the memory 1-2 of the computer 1, on the basis of the port address of the received packet, in the case where this packet represents a message to be sent to the computer 1.

Figure 1:
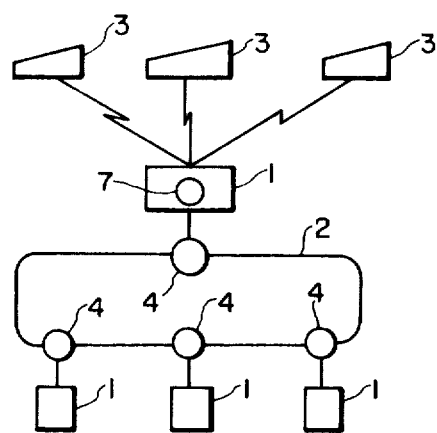
FIG. 1 is a block diagram showing a data communication system according to the prior art.
Figure 2:
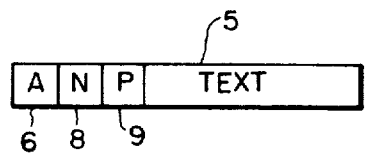
FIG. 2 is a diagrammatic view showing a packet format.

Moreover, the processor 10 also performs the necessary processing, by which the packet is prepared according to the packet format and is sent to the distributor on the basis of the data sent from the computer 1 or the terminal interface 12. Thus, the processor 10 performs that data processing for the packet transmission and reception which was previously performed by the computer 1 in the conventional system shown in FIG. 1. Moreover, all of the processors 10 are operated in parallel. As a result, the data processing for packet transmission and reception is so accelerated that the transmission and reception of the packet is performed at a high speed between the communication line 2 and the computer 1 or the terminal 3.

The distributor 11 on the one hand transfers the packet received by the station 4 to one of the processors 10 at a high speed and on the other hand takes the packet to be sent out of one of the processors 10 and forwards the same to the station 4.

Figure 4:
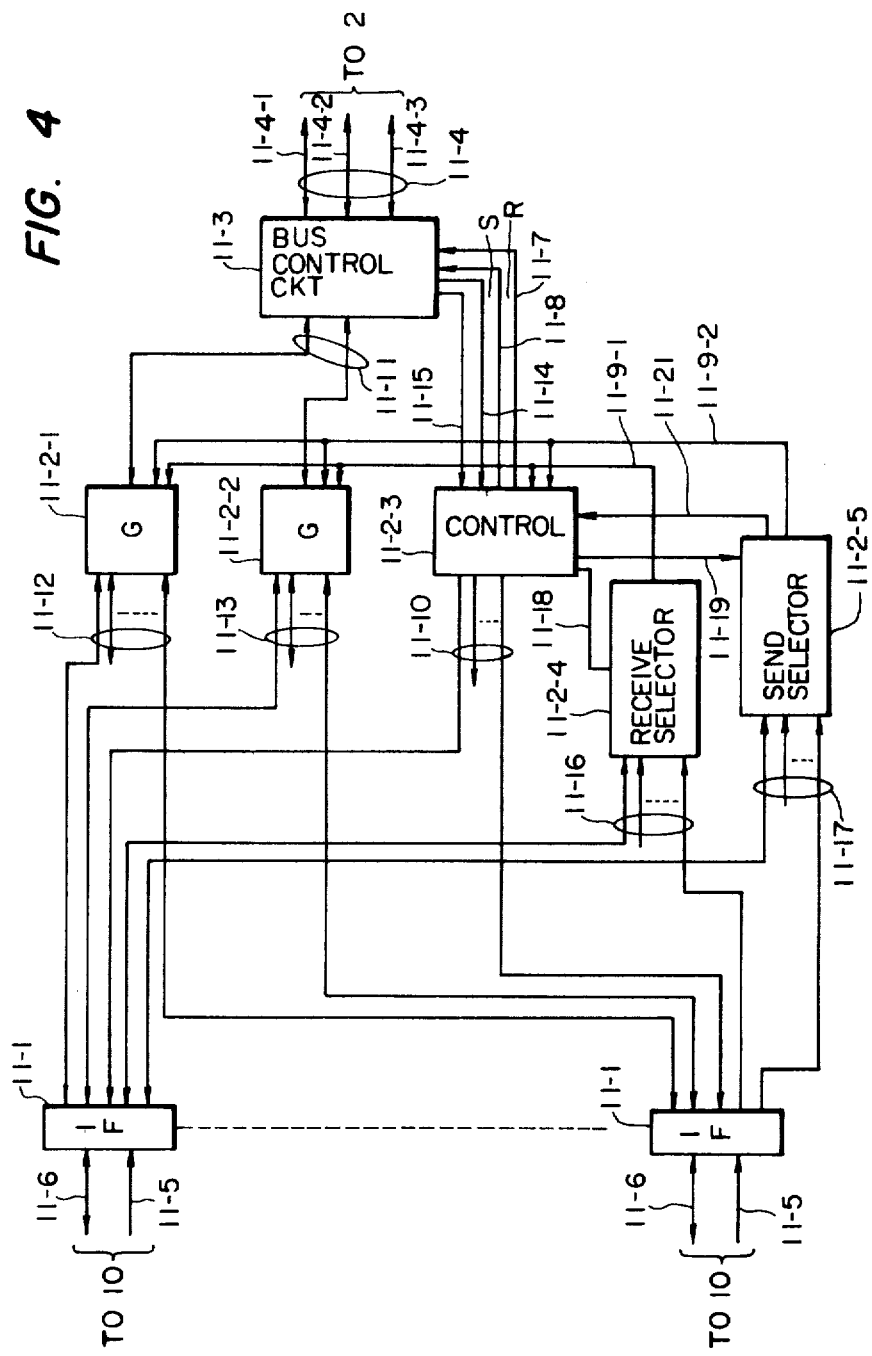
FIG. 4 is a schematic block diagram of a distributor for use in the system of FIG. 3.

The distributor 11 is composed, as shown in FIG. 4, of a plurality of interface circuits (IF) 11-1 each assigned to and connected with a respective one of the processors 10, a bus control circuit 11-3 for controlling the transmission through a bus 11-4 connected with the station 4, gate circuits 11-2-1 and 11-2-2 for selectively connecting the bus control circuit 11-3 to one of the plural interface circuits 11-1, a receive selector 11-2-4 and a send selector 11-2-5 for controlling those gate circuits, and a control 11-2-3 for controlling the preceding circuits.

The bus 11-4 is composed of a data line 11-4-2 for transmitting the packet, an address line 11-4-1 for transmitting the address, and a control line 11-4-3 for sending a control signal. The data line 11-4-2 and the address line 11-4-1 are connected under the control of the bus control circuit 11-3 via the data line and address line in the bus 11-11, respectively, through the gate circuits 11-2-2 and 11-2-1, respectively, to one of the plural data lines in a bidirectional bus 11-13 and one of the plural address lines in the unidirectional bus 11-12. Each of the data lines in the bus 11-12 and each of the address lines in the bus 11-13 are connected to a corresponding one of the interface circuits 11-1. Each of the interface circuits 11-1 connects the selected one of the address lines in the bus 11-12, the selected one of the data lines in the bus 11-13 and the selected one of the control lines of the output bus 11-10 of the control 11-2-3 to the DMA control circuit 10-4 in the corresponding processor 10 through a bidirectional bus 11-6. Each of the interface circuits 11-1 is connected with the status control circuit 10-5 in the corresponding proceccor 10 through a bus 11-5 for sending the control signal.

Each of the processors 10 feed the corresponding interface circuit 11-1 through the bus 11-5 with a buffer status signal which is indicative of whether or not the buffer memory region in the memory 10-3 thereof is being used. This buffer status signal received by each of the interface circuits 11-1 is fed through a bus 11-16 to the receive selector 11-2-4 and is used to control the gate circuits 11-2-1 and 11-2-2 such that the packet received is sent to one of the processors 10, the buffer memory of which is not being used. Moreover, each of the processors 10 feeds a send demand out of the status control circuit 10-5 therein to the corresponding interface circuit 11-1 through the bus 11-5. This send demand received by each of the interface circuits 11-1 is sent through a bus 11-17 to the send selector 11-2-5 and is used to control the gate circuits 11-2-1 and 11-2-2 such that the packet can be sent from the processor 10 which has produced the send demand.

The control 11-2-3 feeds each of the interface circuits 11-1 through the bus 11-10 and the DMA control circuit 10-4 in the corresponding processor 10 through the bus 11-6 with a signal for controlling the sending and reception of the packet by the processors 10.

Data transfer among the computer 1, the terminal interface 12, the processors 10 and the station 4 is conducted with a well known DMA (Directory Memory Access) method. The interface 1-3 of the computer 1 includes a DMA circuit for transferring data by the DMA method between the memory 1-2 and the bus 13. The interface 12-3 of the terminal interface 12 includes a DMA circuit for transferring data by the method between the memory 12-2 and the bus 13. The interface 10-2 of the computer 10 includes a DMA circuit for transferring data by the method between the memory 10-3 and the bus 13.

The operations of the data communication system according to the present embodiment will be described in the following.

Receiving Operation

The station 4 judges whether or not the station address 6 of the packet 5 received through the communication line 2 is coincident with the address of that station and takes the packet 5, which is judged to be destined for that station, into the buffer (not shown). Then, an interruption signal is sent from the station to the distributor 11 through the control line 11-4-3 in the bus 11-4. This interruption signal is received by the bus control circuit 11-3, from which it is transmitted through the line 11-15 to the control 11-2-3.

In response to the interruption signal on line 11-15, the control 11-2-3 sends a selection instructing signal to the receive selector 11-2-4 through a line 11-18. The receive selector 11-2-4 is fed, as has been described, with the buffer status signal from each of the processors 10 through the bus 11-16. This selector 11-2-4, in response to receipt of the selection instructing signal from the control 11-2-3, selects one processor 10 generating a buffer status signal on the bus 11-16 which indicates that the buffer therein is not being used.

Figure 5:
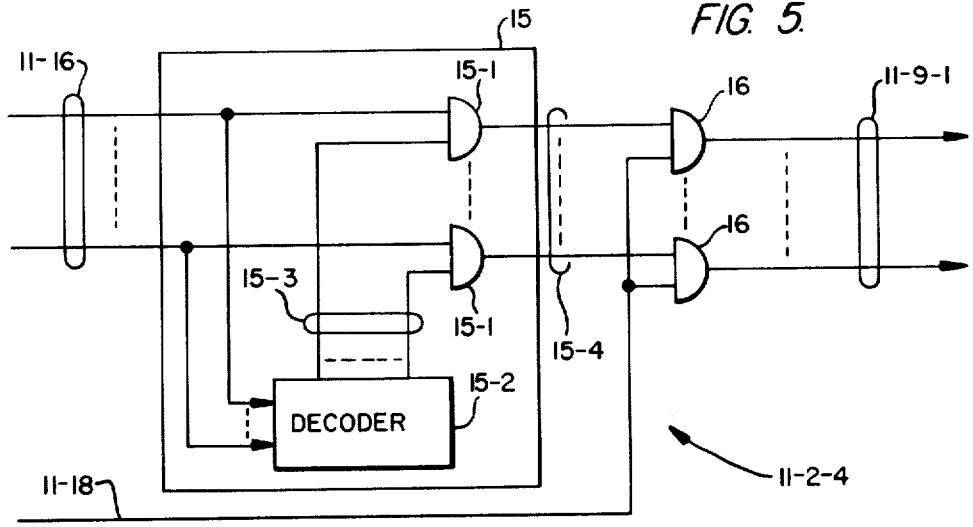
FIG. 5 is a schematic block diagram of a receive selector for use in the distrubutor of FIG. 4.

As shown in FIG. 5, the receive selector 11-2-4 includes the first gate circuit 15 for connecting each line of the bus 11-16 to a corresponding line of an internal bus 15-4 which has the same number of lines as the bus 11-16. The first gate circuit 15 selects only one line of the bus 11-16 on which one line there exists a buffer status signal indicating that the corresponding buffer is not being used. Such signal will be referred to as a buffer empty signal hereinafter. The first gate circuit 15 transfers the buffer empty signal on the selected line to a corresponding line of the internal bus 15-4.

The first gate circuit 15 includes the same number of AND gates 15-1 as the lines of the bus 11-16 and each of the AND gates 15-1 is interposed between a corresponding pair of one line of the bus 11-16 and one line of the internal bus 15-4. The first gate circuit 15 further includes a decoder 15-2 connected to the bus 11-16. The decoder 15-2 responds to the buffer status signals on the bus 11-16 in order to control the AND gates 15-1 by a line 15-3 so that only one line of the bus 11-16 on which one line there exists the buffer empty signal is selected and the buffer empty signal on the selected line is transferred to a corresponding line of the internal bus 15-4. If there is the buffer empty signal on several lines of the bus 11-16 simultaneously, the decoder 15-2 selectively enables only one of such AND gates 15-1 as connected to the several lines of the bus 11-16, for example one of such AND gates 15-1 which has the uppermost position in FIG.'s 4 or 5 among such AND gates 15-1. Thus, only the buffer empty signal on the selected line of the bus 11-16 is transferred to a corresponding line of the internal bus 15-4.

The same number of AND gates 16 as the lines of the internal bus 15-4 connect each line of the bus 15-4 to a corresponding line of the bus 11-9-1 which has the same number of lines as the internal bus 15-4. The AND gates 16 are enabled by the selection instruction signal on the line 11-18.

Thus, the receive selector 11-2-4 provides on one line of the bus 11-9-1 the buffer empty signal in response to the selection instruction signal on the line 11-18. The signal on the bus 11-9-1 indicates which one of the processors 10 is selected among the processors 10 which have generated the buffer empty signal.

The signal on the bus 11-9-1 is sent to the control 11-2-3 and the gate circuits 11-2-1 and 11-2-2. The signal on the bus 11-9-1 is used by the control 11-10 as explained later on.

In response to that selection signal on bus 11-9-1, the gate circuit 11-2-1 for the address bus and the gate circuit 11-2-2 for the data bus connect the bus 11-11 to the corresponding line of each of the buses 11-12 and 11-13 which extend to the one interface circuit 11-1 which is associated with the selected processor 10. Thus, the address and data communication lines are established between one of the processors 10 and the station 4. After that, the control 11-2-3 sends a reception command (R) to the bus control circuit 11-3 through a line 11-7. The bus control circuit 11-3 responds to this reception command to send out a read demand to the station 4 through the control line 11-4-3.

In response to this read demand, the station 4 sends out the address of the buffer memory region in the processor 10 and the received packet to the lines 11-4-1 and 11-4-2. That address in the buffer memory region is stored in advance in the station 4. This address and packet are sent to the DMA control circuit 10-4 in the selected processor 10 through the bus-control circuit 11-3, the bus 11-11, the gate circuits 11-2-1 and 11-2-2, the buses 11-12 and 11-13, the interface circuit 11-1 and the bus 11-6. The DMA control circuit 10-4 informs the status control circuit 10-5 of the reception of the packet, and the status control circuit 10-5 in turn so changes the buffer status control signal to be sent to the line 11-5 as to indicate that the buffer is being used. The DMA control circuit 10-4 stores the received packet in the buffer memory region in the corresponding memory 10-3 designated by the aforementioned address.

The transmission of the packet is performed for a predetermined length. When those packet storing operations are repeated until all the packets are stored in the memory 10-3, the station 4 sends a reception terminating interruption to the bus control circuit 11-3 through the control line 11-4-3. The bus control circuit 11-3 in turn sends that interruption to the control 11-2-3 through the line 11-15. In response to that interruption, the control 11-2-3 sends the reception terminating interruption to the DMA control circuit 10-4 of the processor 10, which is selected by the receive selector 11-2-4, through the bus 11-10, the interface circuit 11-1 and the bus 11-6. Then, the DMA control circuit 10-4 sends that reception terminating interruption to the central processing unit 10-1 through the bus 10-6.

In response to that interruption, the central processing unit 10-1 accomplishes the following processing in accordance with the processing program. First of all, the processing unit 10-1 judges whether the computer 1 or one of the plural terminals 3 is designated by the node address 8 of the received packet. In the case of the packet assigned to one of the terminals, moreover, the processing unit 10-1 sends out both the address corresponding to the node address of the packet and the text in the packet to the bus 13 through the bus interface 10-2. The control of the right to use the bus 13 is performed by any well-known arbitration method. One of the terminal interfaces 12 judges that it is designated by the address on the bus 13 and receives and sends the text in the packet to the corresponding terminal 3. In case the node address of the received packet designates the computer 1, the central processing unit 10-1 determines, on the basis of said port address, that address in the memory 1-2 in the computer 1 which is to store the received packet. For this purpose, the central processing unit 10-1 feeds the computer 1 through the interface circuit 10-2 and the bus 13 with the command for instructing the computer 1 to read the store address for said port address out of the memory 1-2 in the computer 1.

Upon reception of the store address sent from the computer 1 through the bus 13, the central processing unit 10-1 feeds the bus 13 with both the data, which is composed of the store address and the text of the received packet, and the address designating the computer 1. This computer 1 takes the data out of the bus 13, when it is informed of the fact that the assigning address assigns itself, and writes the text of the received packet in that position in the memory 1-2, which is assigned by the store address. After the packet text has been sent to the terminal interface 12 or the computer 1, the central processing unit 10-1 in the processor 10 feeds the status control circuit 10-5 with a command which changes the buffer status signal sent to the line 11-5 by the status control circuit 10-5 so as to indicate that the buffer is not being used.

Thus, the receiving operation relating to one packet is finished. In case the station 4 receives another packet during the receiving operation, the control 11-2-3 in the distributor 11 uses the receive selector 11-2-4 thereby to select another processor 10 having a buffer which is not being used at that time to perform the processing of the packet newly received, as has been described in the above. As a result, the packets being subsequently received by the station 4 are processed in parallel by the plural processors.

Sending Operation

The transmission from the computer 1 will now be described by way of example. When the send demand from the user program in the computer 1 is issued, the standard packet processing program in the computer 1 registers packet data comprising both the text of the packet and the parameter, which is so assigned by the user as to be added to said text in order to determine the node address and the port address, as a set in the memory 1-2 in a transmission awaiting que.

In order to take the transmission awaiting packet data one by one out of the awaiting que, each of the processors 10 sends out the memory address and the read demand to the aforementioned bus 13 by way of the bus interface circuit 10-2, when the bus is not engaged in a sending or receiving operation, thereby to read the transmission awaiting packet data out of the memory 1-2 by way of the interface circuit 1-3 of the computer 1.

When the transmission awaiting packet data is taken out, the station address 6, node address 8 and port address 9 of the packet 5 are determined in accordance with the parameter thereof, and the text portion is attached to prepare the packet 5. Then, a send demand prepared in the memory 10-3 beforehand is fed to the status control circuit 10-5 of the processor 10 by the processing unit 10-1 thereby to turn on the send demanding line in the bus 11-5. That send demand is transmitted to the send selector 11-2-5 through the interface circuit 11-1 and bus 11-17 of the distributor 11.

Figure 6:
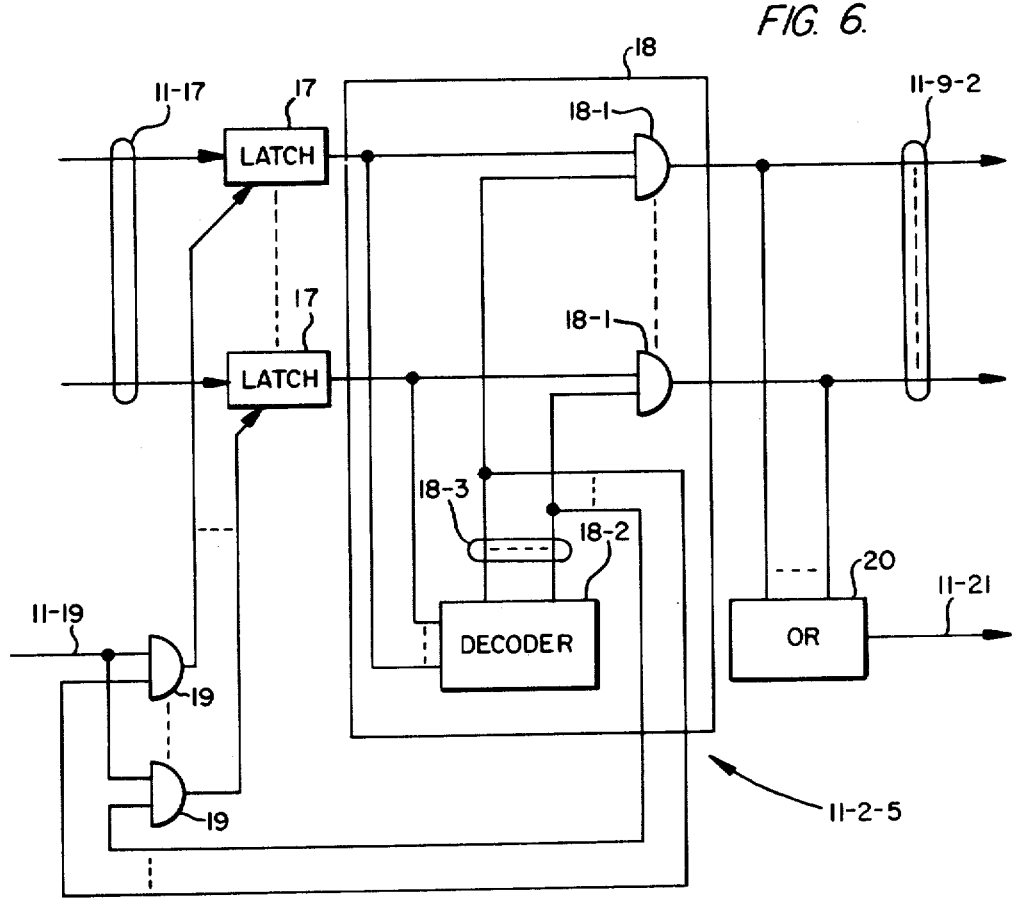
FIG. 6 is a schematic block diagram of a send selector for use in the distrubutor of FIG. 4.

As shown in FIG. 6, the send selector 11-2-5 is provided with the same number of status latches 17 as the processors 10. The status latches 17 indicate whether or not the corresponding processors 10 are in their sending operation, and each status latch is set in response to the send demand fed through the bus 11-17 from the corresponding processor 10. The send selector 11-2-5 further includes a gate circuit 18 for connecting each status latch 17 to a corresponding line of the bus 11-9-2 which has the same number of lines as the status latches 17. The gate circuit 18 selects only one of the status latches 17 which are in set states and transfers the output of the selected status latch to a corresponding line of the bus 11-9-2. The selection rule of the status latches 17 by the gate circuit 18 may be the same as the selection rule of the buffer empty signals by the receive selector 11-2-4. Therefore, the gate circuit 18 includes the same circuit elements as the first gate circuit 15 of the receive selector 11-2-4. That is, the gate circuit 18 includes AND gates 18-1 each interposed between a pair of one status latch and one line of the bus 11-9-2, and further includes a decoder 18-2 which has the same circuit configuration as the decoder 15-2 of the receive selector 11-2-4. The decoder 18-2 enables one of the AND gates 18-1 by the line 18-3.

Thus, the send selector 11-2-5 provides an output signal of the selected status latch 17 on a corresponding line of the bus 11-9-2. The signal on the bus 11-9-2 indicates which one of the processors 10 is selected among the processors 10 which have generated the send demand.

The output of the decoder 18-2 is fed to AND gates 19 respectively connected to the status latches 17 by way of the line 18-3 in order to enable one AND gate 19 which is connected to the selected status latch 17. The enabled AND gate 19 allows the selected status latch 17 to be reset after sending operation is finished, as explained later.

The send selector 11-2-5 further includes an OR gate 20 which provides an OR signal of all the signals on the bus 11-9-2. The OR signal is sent to the control 11-2-3 by the line 11-21 as a send start signal.

The bus 11-9-2 includes the same number of lines as the status latches 17. Each line of the bus 11-9-2 is connected to a corresponding status latch by means of a gate circuit 18 included in the selector 11-2-5. The gate circuit 18 is constructed so that it selects only one of the status latches which are in set states, and provides the output of the selected latch to a corresponding line of the bus 11-9-2. After the sending operation for the processor 10 corresponding to the selected latch is finished, the selected latch is reset in response to a signal on the line 11-19, as explained later on. The selection rule of the gate circuit can be the same as explained with the first gate circuit of the receive selector 11-2-4.

The send selector 11-2-5 further includes an OR gate (not shown) which provides an OR signal of the signals on the all lines of the bus 11-9-2. The OR signal is sent to the control 11-2-3 by the line 11-21 as a send start signal.

The signal thus generated on the bus 11-9-2 by the send selector 11-2-5 is sent out through the bus 11-9-2 to the address gate circuit 11-2-1 and the data gate circuit 11-2-2 thereby to set the data and address transmission lines for the processors 10 and the station 4. In response to the send start signal, the control 11-2-3 feeds out a send command (S) to the bus control circuit 11-3 through a line 11-8. The bus control circuit 11-3 sends out the write demand to the station 4 by the use of the control line 11-4-3 of the bus 11-4.

The station 4 feeds the DMA control circuit 10-5 of the processor 10 which has been selected, in a similar manner to that of the receiving operation, through the aforementioned data and address transmission lines with both the address in the buffer region of the memory 10-3 and the data indicating that the packet is to be read out of the memory 10-3 thereby to read the data out of the memory 10-3 of the processor 10 and to send out the same to the communication line 2.

After this sending operation, a transmission terminating interruption is generated on the control line 11-4-3 by the station 4. The interruption signal thus generated is sent to the bus control circuit 11-3, from which it is applied to the control 11-2-3 through a line 11-14. In response to the transmission terminating interruption, the control 11-2-3 sends that interruption signal to the one bus 11-10 which is assigned by the selection signal received from the bus 11-2-9, so that the interruption signal is transmitted through the corresponding interface circuit 11-1 to the DMA control circuit 10-5 in the corresponding processor 10. The DMA control circuit 10-5 interrupts the processor 10.

In response to that transmission terminating interruption, the program of the processor 10 establishes the transmission terminating interruption in the computer 1 through the bus 13 and the bus interface circuit 10-2 after the processing following the transmission termination has been accomplished within the processor 10. In response to that transmission terminating interruption, the packet processing program in the computer 1 informs the user program of the transmission termination.

The control 11-2-3 feeds a line 11-19 with the interruption signal received on line 11-14, whereby the selected status latch 17 of the send selector 11-2-5 is reset as the signal is provided to the selected status latch 17 through the selectively enabled one of the AND gates 19 of the send selector 11-2-5. When the selected status latch 17 is reset, the decoder 15-2 of the send selector 11-2-5 selects one of the status latches 17 which is still in set states, if there is any. Thus, the send selector 11-2-5 selects another processor 10 which has generated the send demand, if there is any such processor 10, and a new sending operation is initiated according to the procedure described above.

Figure 7:
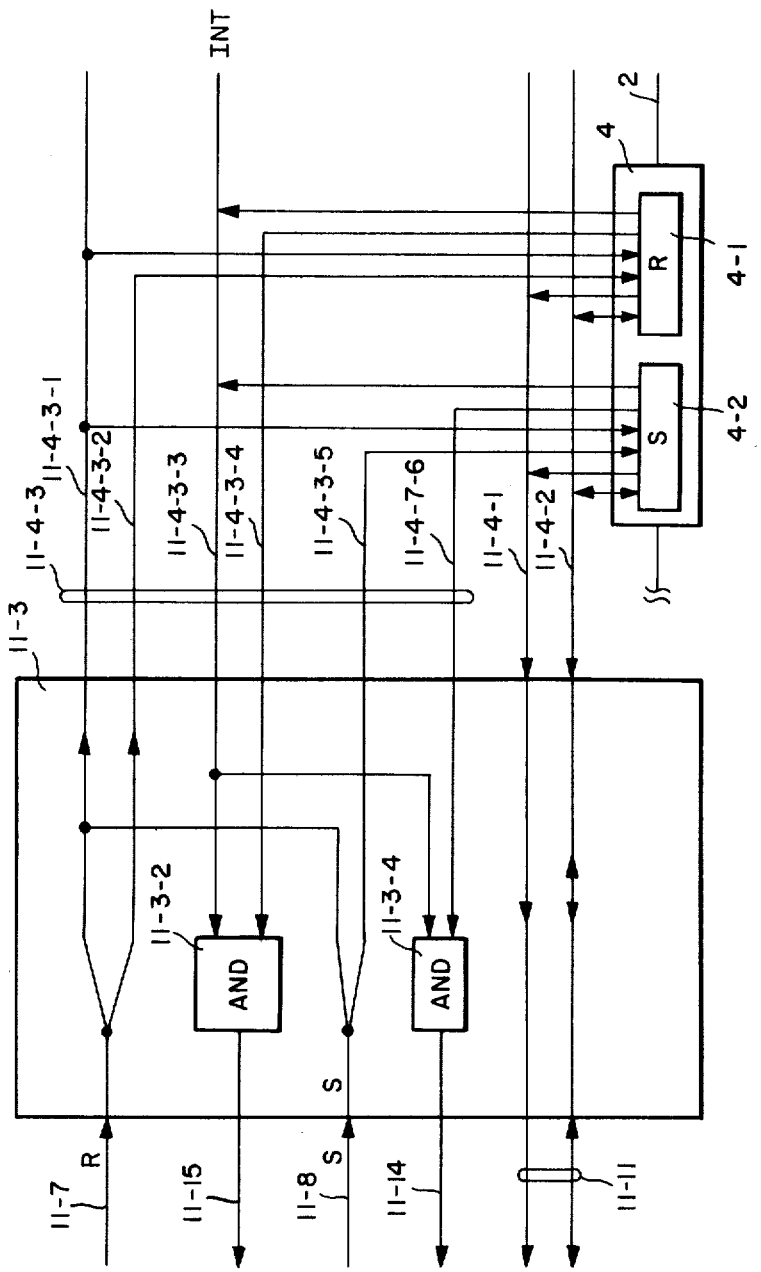
FIG. 7 is a schematic block diagram of a bus control circuit for use in the distrubutor of FIG. 4 and its connection with the station.
Figure 8:
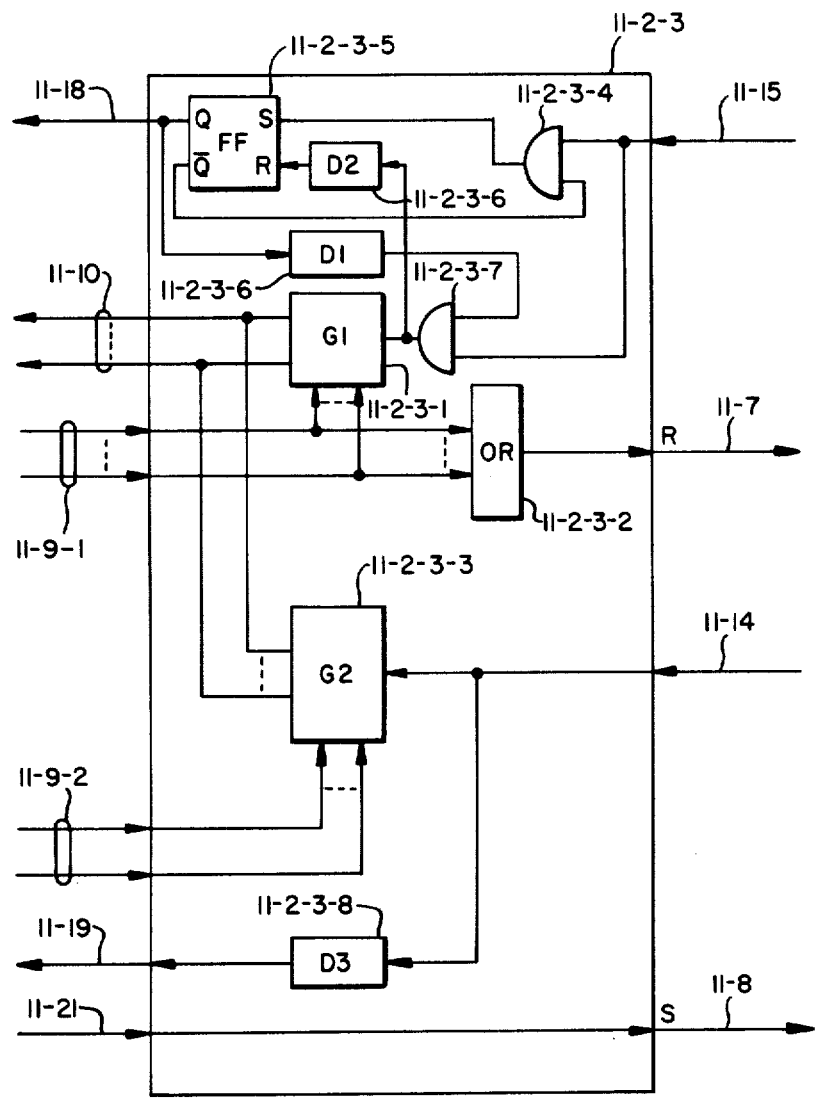
FIG. 8 is a schematic block diagram of a control for use in the destrubutor of FIG. 4.

These are principal operations of the embodiment of the present invention. Below is given an supplemental explanation about the operation of the bus control circuit 11-3, the station 4 and the control 11-2-3 by referring to FIGS. 7 and 8.

<Bus Control Circuit and Station>

Receiving Operation

The interruption signal provided by the station 4, as explained before, when it receives a packet from the communication line 2 is generated by a receive part 4-1 of the station 4 and comprises a device interruption signal and a receive-part identifying signal. These signals are sent to an AND gate 11-3-2 of the bus control circuit 11-3 respectively by way of lines 11-4-3-3 and 11-4-3-4 included in the control line 11-4-3. The interruption signal which the bus control circuit 11-3 provides on the line 11-15, as explained before, in response to the interruption signal from the station 4 at receiving a packet is generated by the AND gate 11-3-2 in response to the two signals. As explained before, the control 11-2-3 sends the reception command R onto the line 11-7 in response to the interruption signal on the line 11-15. The former and the latter are generated by merely transferring the reception command R to lines 11-4-3-1 and 11-4-3-2, respectively, within the bus control circuit 11-3. The line 11-4-3-1 is connected to both the receive part 4-1 and a send part 4-2 of the station 4. The line 11-4-3-2 is connected only to the receive part 4-1. In response to the both signals, the receive part 4-1 starts the transferring operation of the received packet by the DMA method as explained before, from the buffer therein (not shown) to the selected processor 10 by way of the buses 11-4-1, 11-4-2 and the bus 11-11. The bus 11-4-1 and 11-4-2 pass through the bus control circuit 11-3 and are connected to the bus 11-11. The reception terminating interruption which the station 4 generates, as explained before, after the transferring is over comprises an interruption signal and a device select signal respectively sent to the lines 11-4-3-3 and 11-4-3-4 by the receive part 4-1 of the station 4. The reception terminating interruption signal which the bus control circuit 11-3 generates on the line 11-15, as explained before, in response to the reception terminating interruption from the station 4 is generated again by the AND gate 11-3-2 in response to the both signals on the lines 11-4-3-3 and 11-4-3-4.

Sending Operation

The write demand explained before which the bus control circuit 11-3 sends to the station 4 in response to the send command S provided by the control 11-2-3 through the line 11-8 comprises a start device signal and a send-part-select signal. The former and the latter are generated by merely transferring the send command S to the lines 11-4-3-1 and 11-4-3-5, respectively. The line 11-4-3-5 is connected only to the send part 4-2 of the station 4. In response to the both signals, the send part 4-2 starts transferring operation of the packet to be sent by the DMA method and transmits the transferred packet to the communication line 2, as explained before. After this sending operation, the send part 4-2 sends the transmission terminating interruption to the bus control circuit 11-3. This transmission terminating interruption comprises an interruption signal and a send-part-select signal. The former and the latter are sent to an AND gate 11-3-4 of the bus control circuit 11-3 by way of lines 11-4-3-3 and 11-4-3-6, respectively. The transmission terminating interruption which the bus control circuit 11-3 sends on the line 11-14, as explained before, in response to the transmission terminating interruption provided by the station 4 is generated by the AND gate 11-3-4 in response to the signals on both lines 11-4-3-3 and 11-4-3-6.

<Control>

Receiving Operation

The selection instructing signal explained before which the control 11-2-3 sends to the receive selector 11-2-4 by way of the line 11-18 in response to the interruption signal given by the bus control circuit 11-3 by way of the line 11-15 when receiving operation is to be begun is generated by an R-S flip-flop 11-2-3-5. The flip-flop 11-2-3-5 is in a reset state except during receiving operation, as will be explained later on. The inverted output of the flip-flop 11-2-3-5 enables an AND gate 11-2-3-4. Therefore, the interruption signal given on the line 11-15 is passed through the AND gate 11-2-3-4 and sets the flip-flop 11-2-3-5. The normal output of the flip-flop 11-2-3-5 is sent to the receive selector 11-2-4 by the line 11-18 as the selection instructing signal. The first delay (D1) interposed between the normal output terminal of the flip-flop 11-2-3-5 and an AND gate 11-2-3-7 has a delay time somewhat longer than the duration period of the interruption signal given on the line 11-15. Therefore, the interruption signal on the line 11-15 does not pass through the AND gate 11-2-3-7 because the gate is disabled at least during the duration period of the interruption signal. Therefore, the flip-flop 11-2-3-5 whose reset input is connected to the AND gate 11-2-3-7 keeps being in a set state and the first gate circuit 11-2-3-7 does not provide any output.

The reception command R which the control 11-2-3 provides on the line 11-7, as explained before, in response to the selection signal on the bus 11-9-1 which the receive selector 11-2-4 generates, as explained before, in response to the selection instructing signal is given by an OR gate 11-2-3-2 by OR-ing the all signals on the bus 11-9-1. It is to be noted that the AND gate 11-2-3-7 will be enabled by the output of the delay 11-2-3-6 when a short period passes after the interruption signal on the line 11-15 disapoears.

The first gate circuit 11-2-3-1 is provided in order to send the reception terminating interruption from the control 11-2-3 to one of the processors 10 which has been selected, as explained before, in response to the reception terminating interruption given to the bus control circuit 11-3 after packet transfer for receiving operation is over. The gate circuit 11-2-3-1 transfers the reception terminating interruption fed from the line 11-15 to one line of the bus 11-10 in response to the selection signal on the bus 11-9-1. The one line of the bus 11-10 is chosen as one corresponding to the same processor 10 as the selection signal on the bus 11-9-1 indicates. It is to be noted that the reception terminating interruption fed from the line 11-15 can pass through because the AND gate 11-2-3-7 is enabled at that time, as explained before. The flip-flop 11-2-3-5 is reset by the reception terminating interruption signal provided by the AND gate 11-2-3-7 after a delay time of the second delay (D2) 11-2-3-6. The delay 11-2-3-6 is provided in order to ascertain that the flip-flop 11-2-3-5 still remains in a set state at least during the duration period of the reception terminating interruption, thereby keeping the selection signal on the bus 11-9-1 unchanged at least during that period. As a result, the first gate circuit 11-2-3-1 can send the reception terminating interruption to the processor 10 which has been engaged in the receiving operation so far. Therefore, the delay time of the second delay 11-2-3-6 is designed to be somewhat larger than the duration period of the reception terminating interruption. When a short period passes after the interruption signal on the line 11-15 disappears, the flip-flop 11-2-3-5 is reset and the AND gate 11-2-3-4 is disabled.

When the delay time of the first delay 11-2-3-6 passes after that, the AND gate 11-2-3-7 is disabled. The whole circuit of the control 11-2-3 restores its initial state. The station 4 is allowed to start receiving operation again after that time, if there is any received packet within the station 4.

Sending Operation

The send command S which should be generated by the control 11-2-3 in response to the send start signal on the line 11-21, as explained before, is generated by merely transferring the send start signal on the line 11-21 to the line 11-8 through the control 11-2-3. As explained before, the transmission terminating interruption signal is fed to the control 11-2-3 from the bus control circuit 11-3 by way of the line 11-4. The interruption signal is sent to one line of the bus 11-10 by means of the second gate circuit (G2) 11-2-3-3 responsive to the selection signal on the bus 11-9-2. The line is one which corresponds to the same processor 10 as the selection signal on the bus 11-9-2 indicates. The transmission terminating interruption fed to the line 11-19 in order to reset the selected status latch 17, as explained before, is provided by passing the transmission terminating interruption signal on the line 11-14 through third delay (D3) 11-2-3-8 to the line 11-19. The third delay 11-2-3-8 is interposed between the two lines in order to ascertain that the selection signal on the bus 11-9-2 does not change at least during the interruption signal exists on the line 11-14, thereby allowing the interruption signal is transferred to the processor 10 which has been engaged in the sending operation so far. For that purpose, the delay time of the third delay 11-2-3-8 is designed to be somewhat longer than the duration period of the interruption signal on the line 11-14.

The present invention should not be limited to the aforementioned embodiment, but can include the following modifications.

(i) In case a single front-end processor is provided, the gate circuits 11-2-1, 11-2-2 can be omitted, and the receive 11-2-4, the send selector 11-2-5 and control 11-2-3 can be simplified in accordance with the reduction of the number of the front end processors.

(ii) The present invention may be a communication system which is not of a loop transmission type, but is a system which has a point-to-point construction.

(iii) In case there is no terminal 3 in the system, it is unnecessary to provide the terminal interface processor 12.

(iv) The computers 1 may be provided in plurality each connected to the bus 13 in the manner already described.

(v) In case only a single computer 1 is provided, the bus 13 may be provided as the bus 1-4 of the computer 1.

(vi) The buffer memory 10-3 of the processor 10 may be provided for a plurality of packets.

As has been described hereinbefore, according to the present invention:

(i) since the packet stream to be received from the communication line is promptly transferred to at least one plural packet processor and to preferably plural packet processors so that most of the packet processings, which have been performed by the computer 1 according to the prior art, are processed by the packet processor; and (ii) in case of plural packet processors, they are processed in parallel; and (iii) since the bypass route connecting the communication line and the terminal is constructed not through the computer but through the processor, the terminal interface processor and the bus establishing the connection inbetween, the following effects can be attained:

(1) The amount of processing of the program to be executed to accommodate the packet flow between the user program in the computer and the communication line is reduced. More specifically, the processings relating to the node and port address fields in the packet are performed by the front-end-processor so that the processings at the computer can be performed by the communication with the bus.

(2) The packet flow with the terminal and the communication line does not pass through the computer so that the program processing of the computer can be dispensed with.

(3) The processing time per packet at the front-end-processor can be equivalently reduced to about 1/n by the parallel processings at the plural (e.g., n number of) front-end-processors.

(4) Since the interface with the communication line is transferred at a high speed in a consecutive and direct memory access to the aforementioned plural front-end-processors having the empty buffers by the action of the distributor, even if only one station is involved, the parallel processings described in the above item (3) are sufficiently performed.

As has been described hereinbefore, according to the present invention, the bottleneck of the program processing overhead at the computer can be eliminated so that the packet processings at a high speed can be accomplished.

While we have shown and described several embodiments in accordance with the present invention, it is understood that the invention is not limited to the details shown and described herein but is susceptible of numerous changes and modifications as known to one of ordinary skill in the art, and we therefore do not wish to be limited to the details shown and described herein but intend to cover all such changes and modifications obvious to those skilled in the art.

What is claimed is:

1. A data communications system for transmitting data including address information and text between computers in a multi-computer system comprising a communication line for transmitting said data between a plurality of stations connected to said communication line which respectively transmit over said communication line to other stations data received via an associated distribution circuit from an associated computer and which respectively receive over said communication line data transmitted by other stations to its associated computer, each station being associated with a different computer within the multi-computer system, each associated pair of computer and station being further associated with a separate distributor and a separate plurality of preprocessors, respectively, each distributor having a single bus coupled to its associated station for transferring data to and from said station and a plurality of distributing busses each being coupled to a separate one of said plurality of preprocessors associated with said associated computer, distributor, and station for transferring data to and from said preprocessor, the preprocessors being coupled to said distributor for parallel operation with said distributor; a plurality of data transfer busses each being coupled between a different one of said plurality of preprocessors, and said computer associated with said station and said distributor and said plurality of preprocessors for transferring data to and from said computer, each preprocessor upon receiving data from said coupled distributor functioning to perform data processing on the received data prior to transmitting processed data to said coupled computer and upon receiving data from said coupled computer functioning to perform data processing on the received data prior to transmitting said processed data to said coupled distributor.

2. A data communication system according to claim 1, wherein each of said processors includes means for generating a store address in accordance with the address information in said received data and for sending out said store address and said text to said computer through said common bus.

3. A data communication system according to claim 2, wherein said station includes means for applying a receive interrupt signal to said selection circuit means in response to receipt of data on said communication line having an address identifying said station.

4. A data communication system according to claim 3, wherein said selection circuit means includes status means connected to each processor to indicate the busy status of said processors, receive selector means responsive to said busy status indication from said status means and said receive interrupt signal from said station for selecting an idle processor, and means responsive to said receive selector means for connecting said station to said selected processor for purposes of transferring said data to said processor from said station.

5. A data communication system according to claim 4, wherein each processor includes means for generating a buffer station signal indicative of the busy/free condition of a buffer memory in said processor, said receive selector means in said selection circuit means comprising a receive selector connected to receive the buffer station signals from said processors and including means for generating a selection signal indicating an idle processor on the basis of said buffer status signals, and said connecting means including gate means responsive to said selection signal for connecting said station to the selected processor.

6. A data communication system according to claim 5, wherein said connecting means includes a plurality of interface circuits, each interface circuit being connected between said gate means and a respective processor.

7. A data communication system according to claim 2, wherein each processor includes means for generating and applying a send demand signal to said selection circuit means from said computer when said computer desires to send data to said communication line via said station, and said selection circuit means includes send selector means responsive to said send demand signal for effecting connection of said station to said processor for purposes of forwarding said data from said computer via said processor to said station.

8. A data communication system according to claim 7, wherein each processor contains a memory location for storing data to be used, and said send selector means in said selection circuit means comprises a send selector connected to receive the send demand signals from said processors, said send selector including means for applying a send command to said station, said station including means responsive to said send command for applying to said selection circuit means an address signal relating to a memory location in a processor from which the data is to be read, and said send selector means further including means responsive to said send selector for forwarding said address signal to the selected processor from which said send demand signal has been received.

9. A data communication system according to claim 6, wherein each processor includes means for applying a send demand signal to said selection circuit means from said computer when said computer desires to send data to said communication line via said station, and said selection circuit means includes send selector means responsive to said send demand signal for effecting connection of said station to said processor for purposes of forwarding said data from said computer via said processor to said station.

10. A data communication system according to claim 9, wherein said send selector means in said selection circuit means comprises a send selector connected to receive the send demand signals from said processors and including means for controlling said gate means to effect connection of said station through a selected interface circuit to the processor from which said send demand signal has been received.

11. A data communication system according to claim 10, wherein each processor includes a memory having a location assigned to store data from said computer to be forwarded to said station, said send selector including means for applying a send command to said station when said station has been connected to a processor via said gate means in response to a send demand signal, said station including means for sending to the selected processor via said selection circuit means an address signal relating to said memory location at which is stored the data to be read out.

12. A data communication system as defined in claims 2, 8 or 11, further including at least one terminal device and a further processor connecting said terminal device to said common bus.

13. A data communication system as defined in claim 12, wherein the address information in said data includes node and port information, and wherein said processors include means responsive to said node and port information for controlling the application of the data to said computer or said terminal device.

* * * * *